United States Patent [19]
Kienzle et al.

[11] Patent Number: 4,976,145
[45] Date of Patent: Dec. 11, 1990

[54] FLOW RATE METER

[75] Inventors: Wolfgang Kienzle, Hemmingen; Rudolf Sauer, Benningen; Otto Woehr, Eberdingen, all of Fed. Rep. of Germany

[73] Assignee: Robert Bosch GmbH, Stuttgart, Fed. Rep. of Germany

[21] Appl. No.: 403,421

[22] Filed: Sep. 6, 1989

[30] Foreign Application Priority Data

Dec. 30, 1988 [DE] Fed. Rep. of Germany ....... 3844354

[51] Int. Cl.$^5$ .............................................. G01F 1/68
[52] U.S. Cl. ................................ 73/204.22; 73/118.2; 73/204.26
[58] Field of Search ............. 73/202.5, 204.21, 204.22, 73/204.23, 204.26, 118.2

[56] References Cited

U.S. PATENT DOCUMENTS

| 4,478,077 | 10/1984 | Bohrer et al. | 73/204.26 |
| 4,517,837 | 5/1985 | Oyama et al. | |
| 4,776,214 | 10/1988 | Moran et al. | 73/204.11 |
| 4,783,996 | 11/1988 | Ohta et al. | 73/204.26 X |
| 4,803,875 | 2/1989 | Kuhn et al. | 73/204.26 |

OTHER PUBLICATIONS

"Hot-Film Air Mass Meter—A Low Cost Sauer Approach to Intake Air Measurements" in SAE Technical Paper Series, Feb.–Mar. 1988.

Primary Examiner—Herbert Goldstein
Attorney, Agent, or Firm—Edwin E. Greigg

[57] ABSTRACT

In flow rate meters with a ceramic substrate extending into a flow opening and having at least one temperature-dependent resistor film, there is the danger that excessive acceleration forces from a fall or from an impact will break the ceramic substrate. There is also the danger of destruction of the ceramic substrate from being unintentionally touched by an object or a finger. To increase the protection of the ceramic substrate against breakage, a reinforcing element is provided on a first housing half, protruding into the flow opening over a portion of the ceramic substrate and being glued to the ceramic substrate in the same manner as the first housing half. Protective ribs protrude from the housing halves into the flow opening in the direction of the ceramic substrate and prevent unintentional contact with the ceramic substract by objects or fingers. The flow rate meter is suitable for measuring the flow rate of the aspirated air in internal combustion engines.

15 Claims, 1 Drawing Sheet

FLOW RATE METER

BACKGROUND OF THE INVENTION

The invention is based on a measuring device for measuring the mass of a flowing medium, or flow rate meter, a defined herein. In a known flow rate meter (SAE Paper No. 880,560), there is a danger that the ceramic substrate, of only a few tenths of a millimeter thick, having the at least one temperature-dependent resistor film will be destroyed by improper handling of the body of the flow rate meter. This may happen for example if it is dropped from a height of over about 60 cm, or from intermittent impacts, or if some object, or a person's fingers, unintentionally touch the ceramic substrate directly.

OBJECT AND SUMMARY OF THE INVENTION

The flow rat meter according to the invention has the advantage over the prior art of better protection of the ceramic substrate against breakage, so that even when dropped from a height of about 1.2 meters or when subjected to major impacts, destruction of the ceramic substrate does not ensue. The reinforcing element that increases the rigidity of the ceramic substrate is simple and relatively inexpensive, without disrupting the flow conditions a the temperature-dependent resistor film.

It is advantageous to embody the reinforcing element in platelike fashion, which lends it a narrow shape extending into the flow opening.

It is particularly advantageous to make the reinforcing element protrude far enough underneath the ceramic substrate that at least one dividing slit, extending from the free end of the ceramic substrate toward the reinforcing element, is partly covered by the reinforcing element. Dividing slits of this kind are cut into the ceramic substrate by sawing. At the cut end of each dividing slit, there is the danger that superfine hairline cracks will lessen the security against breakage. If the reinforcing element extends as far as underneath such a cut end of a dividing slit, then the ceramic substrate is relieved in the vicinity of the cut end of the dividing slit, and the danger of breakage is lessened.

It is also especially advantageous if on at least one of the housing halves, a narrowly embodied protective rib is provided, extending into the flow opening transversely to the ceramic substrate. By this means, unintentional contact by an object or a finger can be avoided.

The invention will be better understood and further objects and advantages thereof will become more apparent from the ensuing detailed description of a preferred embodiment, taken in conjunction with the drawings.

DESCRIPTION OF THE PREFERRED EMBODIMENT

Figure 1:
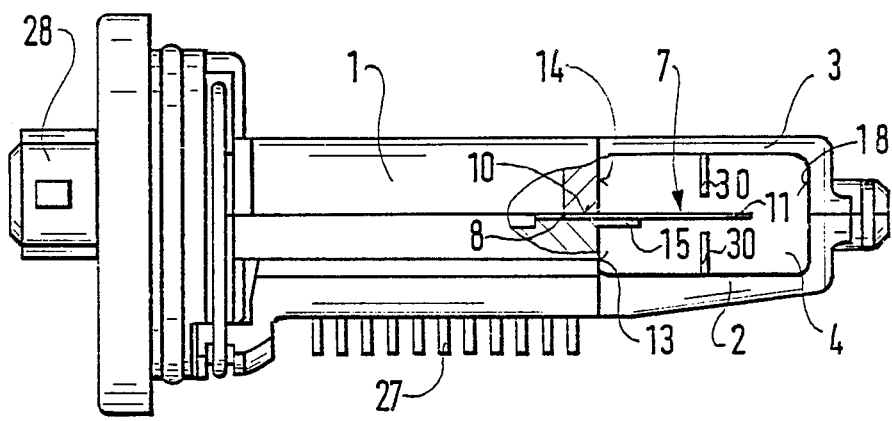
FIG. 1 shows a flow rate meter embodied in accordance with the invention.
Figure 2:
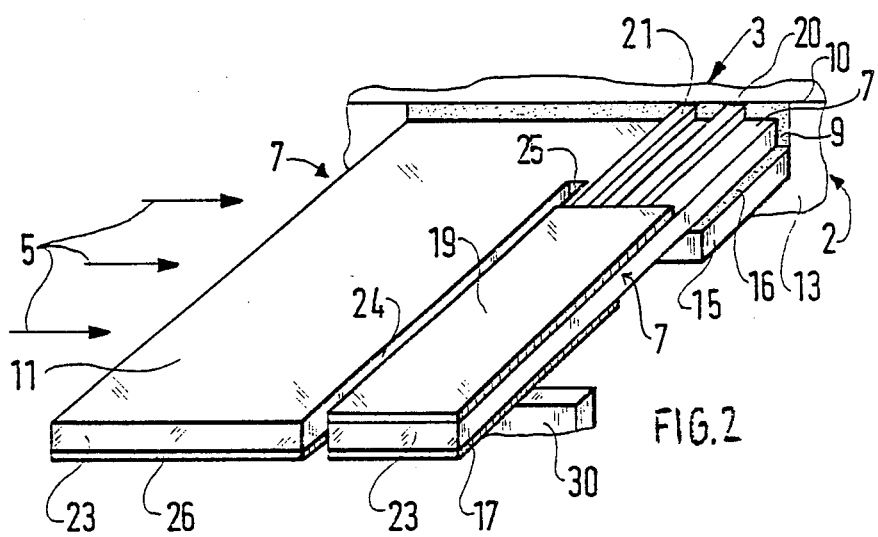
FIG. 2 is a fragmentary view, on a larger scale, of the flow rate meter detection surface shown in FIG. 1.

The device for measuring the flow rate of a flowing medium shown in FIG. 1 may in particular be used to measure the aspirated air flow in internal combustion engines and has a body 1, which in addition to other parts, not shown in detail here, has a first housing half 2 and a second housing half 3 with an inner space thereinbetween. The first housing half 2 and the second housing half 3 are convex and are provided with a flow opening 4 of approximately rectangular cross section. The walls of the flow opening 4 extend in the flow direction; they may extend either parallel or in venturi-like fashion. In FIG. 2, the flow direction 5 is represented by arrows A further component of the flow rate meter is a ceramic substrate 7, which to the left extends with a fixed end 8 in a receiving groove 9 of the first housing half 2 along a dividing plane 10 between the two housing halves 2, 3, and to the right protrudes with its free end 11 into the flow opening 4. About half of each of the horizontally extending side walls 14, 18 of the flow opening 4 is formed by the two housing halves 2, 3; the division is in the dividing plane 10, and the segments of each side wall are flush with one another. From the segment 13 of the left side wall 14 of the flow opening 4, which is formed by the first housing half 2, a reinforcing element 15 directly adjoining the receiving groove 9 protrudes into the flow opening 4. The reinforcing element 15 is advantageously embodied directly as part of the first housing half 2 and extends underneath a portion of the ceramic substrate 7. By means of an adhesive 16, introduced both between the ceramic substrate 7 and the receiving groove 9 and between the substrate and the reinforcing element 15, the ceramic substrate 7 is glued to the first housing half 2. The adhesive is also introduced between the ceramic substrate 7 and the second housing half 3 during assembly, so that the free end 11 of the ceramic substrate 7 protrudes out of the housing halves 2, 3 in a sealed manner. The retention of the ceramic substrate 7 on the first housing half 2 and the reinforcing element 15, respectively, by means of the adhesive 16 and the sealing with respect to the second housing half 3 assures a strain-free mounting of the ceramic substrate 7, so that undesirable strains need not already be exerted o the ceramic substrate 7 during its assembly. The reinforcing element 15 is preferably platelike and narrow, so that any influence on the flow that would perturb the outcome of the measurement is avoided. The reinforcing element 15 extends over about the same width in the flow direction a the ceramic substrate 7 does.

In greater detail, FIG. 2 shows a temperature-dependent resistor film 17 that serves for instance as a measuring resistor applied to the underside surface of the ceramic substrate 7, outside the area covered by the reinforcing element 15. A further resistor film 19 is applied to the top surface of the ceramic substrate 7 opposite the temperature-dependent resistor film 17 this film 19 is approximately equivalent in width to the temperature-dependent resistor film, but transverse to the flow direction 5 it is longer than the temperature-dependant resistor film, and its electrical connection tracks, embodied as films, are identified by reference numerals 20 and 21. Beginning at the end face 23 of the ceramic substrate 7, a dividing slit 24 extends transversely to the flow direction 5, being made for instance by sawing and terminating at one cut end 25, which is preferably covered by the reinforcing element 15. This relieves the ceramic substrate 7 in the region of the cut end 25, in which there is an increased danger of breakage from hairline cracks. On the same side of the ceramic substrate 7 that the temperature-dependent resistor film 17 is disposed on, and separated by the dividing slit 24, a further resistor film, for instance a temperature-compensating resistor film 26, is also applied to the ceramic substrate; this resistor film 26, like the temperature-dependent resistor film 17 is part of a bridge circuit the other components of which are accommodated in the body 1 of the flow rate meter and the function of which need no be described here because it is well known to one skilled in the art, for instance from SAE Paper No. 880,560.

To assure better heat dissipation of the heat-generating elements of the electronic regulating device for the flow rate meter, a finlike cooling device 27 is disposed on the meter body 1, enabling heat dissipation to the ambient air. The supply of energy from a voltage source, and the further transmission of the measurement signal, are effected via an electric plug 28 on the meter body 1.

Because of the described embodiment of the reinforcing element 15, and because of the reinforcement of the ceramic substrate 7 by the reinforcing element 15, the ceramic substrate 7 has an increased capacity to withstand strains when dropped or when suddenly accelerated by impacts, so that with a ceramic substrate 7 protruding to a length of approximately 17 mm into the flow opening 4, the reinforcement by a reinforcing element 15 protruding approximately 4 mm underneath the ceramic substrate 7 into the flow opening has the effect that protection against breakage if the flow meter is dropped from a height of approximately 1.2 meters is assured.

Further security against destruction of the ceramic substrate 7 from unintentional touching by an object or a finger is assured by the disposition of protective ribs 30, which are located approximately in the middle of the flow opening 4 and which extend, beginning at each of the housing halves 2, 3, toward the ceramic substrate 7 ending sufficiently far from it. Each protective rib 30 extends in the flow direction 5 and is embodied as narrow, so that it does not lead to any influence on the flow at the temperature-dependent resistor film 17.

The foregoing relates to a preferred exemplary embodiment of the invention, it being understood that other variants and embodiments thereof are possible within the spirit and scope of the invention the latter being defined by the appended claims.

What is claimed and desired to be secured by Letters Patent of the United States is:

1. A meter for measuring the flow rate of a flowing medium, in particular for measuring the flow rate of aspirated air in an internal combustion engine in a flow area of a housing, said housing extending transversely to the flow direction, a ceramic substrate that is secured at one end to said housing and which includes a free end that protrudes therefrom and extends into said flow area with its free end having at least one temperature-dependent resistor film on at least one surface thereof said housing including a first half and a second half, the fixed end of said substrate extends in a dividing plane between said first housing half and said second housing half, in which said fixed end (8) of the ceramic substrate (7) is affixed to said first housing half (2), and a reinforcing element (15) in said first housing half extends into the flow area in a direction of said free end of said ceramic substrate underneath a portion of said ceramic substrate (7) to support a portion of said ceramic substrate which portion is affixed to said reinforcing element.

2. A meter as set forth in claim 1, in which said portion of said ceramic substrate supported by said reinforcement element (15) is affixed thereto by glue.

3. A flow rate meter as defined by claim 1, in which said reinforcing element (15) is embodied in platelike fashion.

4. A flow rate meter as defined by claim 2, in which said reinforcing element (15) is embodied in platelike fashion.

5. A flow rate meter as defined by claim 1, in which said ceramic substrate includes at least one longitudinal dividing slit (24), and said reinforcing element (15) protrudes far enough underneath said ceramic substrate (7) that said at least one dividing slit (24), extending from the free end (11) of the ceramic substrate (7) toward the reinforcing element (15), is partly covered by said reinforcing element (15).

6. A flow rate meter as defined by claim 1, in which said housing halves (2, 3) enclose a flow opening (4), extending in a flow direction (5), into which said ceramic substrate (7) protrudes with its free end (11).

7. A flow rate meter as defined by claim 2, in which said housing halves (2, 3) enclose a flow opening (4), extending in a flow direction (5), into which said ceramic substrate (7) protrudes with its free end (11).

8. A flow rate meter as defined by claim 3, in which said housing halves (2, 3) enclose a flow opening (4), extending in a flow direction (5), into which said ceramic substrate (7) protrudes with its free end (11).

9. A flow rate meter as defined by claim 4, in which said housing halves (2, 3) enclose a flow opening (4), extending in a flow direction (5), into which said ceramic substrate (7) protrudes with its free end (11).

10. A flow rate meter as defined by claim 5, in which said housing halves (2, 3) enclose a flow opening (4), extending in a flow direction (5), into which said ceramic substrate (7) protrudes with its free end (11).

11. A flow rate meter as defined by claim 6, in which a narrowly embodied protective rib (30) is located on at least on one of the housing halves (2, 3) and extends into the flow opening (4) transversely to the ceramic substrate (7).

12. A flow rate meter as defined by claim 7, in which a narrowly embodied protective rib (30) is located on at least on one of the housing halves (2, 3) and extends into the flow opening (4) transversely to the ceramic substrate (7).

13. A flow rate meter as defined by claim 8, in which a narrowly embodied protective rib (30) is located on at least on one of the housing halves (2, 3) and extends into the flow opening (4) transversely to the ceramic substrate (7).

14. A flow rate meter as defined by claim 9, in which a narrowly embodied protective rib (30) is located on at least on one of the housing halves (2, 3) and extends into the flow opening (4) transversely to the ceramic substrate (7)

15. A flow rate meter as defined by claim 10, in which a narrowly embodied protective rib (30) is located on at least on one of the housing halves (2, 3) and extends into the flow opening (4) transversely to the ceramic substrate (7).

* * * * *